US010294336B2

(12) United States Patent
Koenig et al.

(10) Patent No.: US 10,294,336 B2
(45) Date of Patent: May 21, 2019

(54) SYNTHESIS OF POLYMER POLYOLS IN UNSATURATED POLYOLS, POLYMER POLYOLS AND THEIR USE

(71) Applicant: BASF SE, Ludwigshafen (DE)

(72) Inventors: Christian Koenig, Mannheim (DE); Andreas Emge, Lemfoerde (DE); Iran Otero Martinez, Stemwede (DE)

(73) Assignee: BASF SE, Ludwigshafen (DE)

( * ) Notice: Subject to any disclaimer, the term of this patent is extended or adjusted under 35 U.S.C. 154(b) by 7 days.

(21) Appl. No.: 15/531,147

(22) PCT Filed: Nov. 26, 2015

(86) PCT No.: PCT/EP2015/077833
§ 371 (c)(1),
(2) Date: May 26, 2017

(87) PCT Pub. No.: WO2016/083538
PCT Pub. Date: Jun. 2, 2016

(65) Prior Publication Data
US 2018/0009956 A1 Jan. 11, 2018

(30) Foreign Application Priority Data
Nov. 27, 2014 (EP) ..................................... 14195072

(51) Int. Cl.
| | | |
|---|---|---|
| *C08J 3/11* | (2006.01) | |
| *C08G 18/63* | (2006.01) | |
| *C08F 283/06* | (2006.01) | |
| *C08F 290/06* | (2006.01) | |
| *C08L 19/00* | (2006.01) | |
| *C08G 18/48* | (2006.01) | |
| *C08G 18/81* | (2006.01) | |
| *C09D 175/04* | (2006.01) | |
| *C09J 175/04* | (2006.01) | |
| *C08G 18/67* | (2006.01) | |
| *C08L 25/12* | (2006.01) | |
| *C08L 47/00* | (2006.01) | |

(52) U.S. Cl.
CPC ............. *C08J 3/11* (2013.01); *C08F 283/065* (2013.01); *C08F 290/062* (2013.01); *C08G 18/4829* (2013.01); *C08G 18/4841* (2013.01); *C08G 18/631* (2013.01); *C08G 18/633* (2013.01); *C08G 18/636* (2013.01); *C08G 18/678* (2013.01); *C08G 18/8108* (2013.01); *C08L 19/006* (2013.01); *C08L 25/12* (2013.01); *C08L 47/00* (2013.01); *C09D 175/04* (2013.01); *C09J 175/04* (2013.01); *C08G 2150/90* (2013.01); *C08G 2190/00* (2013.01); *C08G 2350/00* (2013.01); *C08G 2380/00* (2013.01); *C08J 2325/12* (2013.01); *C08J 2447/00* (2013.01)

(58) Field of Classification Search
CPC .............. C08G 18/636; C08G 18/4829; C08G 18/4841; C08G 18/631; C08G 18/633; C08G 18/8108; C08G 18/678; C08G 2150/90; C08G 2190/00; C08G 2350/00; C08G 2380/00; C08L 47/00; C08L 19/006; C08L 25/12; C08L 55/005; C08F 290/062; C08F 283/065; C09D 175/04; C09J 175/04; C09J 3/11; C09J 2447/00; C09J 2325/12; C08J 3/11; C08J 2447/00; C08J 2325/12
See application file for complete search history.

(56) References Cited

U.S. PATENT DOCUMENTS

| | | |
|---|---|---|
| 5,990,185 A | 11/1999 | Fogg |
| 6,013,731 A | 1/2000 | Holeschovsky et al. |
| 6,623,827 B2 | 9/2003 | Schottland et al. |
| 9,464,158 B2 | 10/2016 | Koch |
| 9,567,500 B2 | 2/2017 | Eling |
| 2010/0160469 A1* | 6/2010 | Adkins et al. ...... C08G 18/4072 521/137 |
| 2011/0213044 A1* | 9/2011 | Van der wal et al. ...... C08G 18/0876 521/88 |
| 2014/0058037 A1* | 2/2014 | Petton et al. ...... C08G 18/0876 524/761 |

FOREIGN PATENT DOCUMENTS

| | | | |
|---|---|---|---|
| EP | 0 755 953 | A2 | 1/1997 |
| EP | 0 786 480 | A1 | 7/1997 |
| EP | 1 675 885 | A2 | 7/2006 |
| JP | 61-200116 | A | 9/1986 |
| JP | 2010-177066 | A | 8/2010 |
| JP | 2011-98310 | A | 5/2011 |
| JP | 2011-207943 | A | 10/2011 |
| WO | WO 2005/003200 | A1 | 1/2005 |
| WO | WO 2008/055952 | A1 | 5/2008 |
| WO | WO 2009/138379 | A2 | 11/2009 |
| WO | WO 2009/155427 | A2 | 12/2009 |
| WO | WO 2010/055631 | A1 | 5/2010 |
| WO | WO 2012/154393 | A2 | 11/2012 |
| WO | WO 2013/039907 | A1 | 3/2013 |

OTHER PUBLICATIONS

U.S. Appl. No. 14/021,351, filed Sep. 9, 2013, 2014/0073712 A1, Iran Otero Martinez.
U.S. Appl. No. 14/898,361, filed May 19, 2016, 2016/0137676 A1, Kevin Rhudy, et al.
U.S. Appl. No. 14/899,923, filed Dec. 18, 2015, 2016/0137814 A1, Iran Otero Martinez.
U.S. Appl. No. 15/035,000, filed May 6, 2016, 2016/0280837 A1, YueXia Feng.
U.S. Appl. No. 15/127,831, filed Sep. 21, 2016, 2017/0110759 A1, Philipp Johannes Boeckmann, et al.

(Continued)

*Primary Examiner* — Nathan M Nutter
(74) *Attorney, Agent, or Firm* — Oblon, McClelland, Maier & Neustadt, L.L.P.

(57) ABSTRACT

The present invention relates to the synthesis of polymer polyols in unsaturated polyols as liquid phase, polymer polyols and their use.

43 Claims, No Drawings

(56) References Cited

OTHER PUBLICATIONS

U.S. Appl. No. 15/306,338, filed Oct. 24, 2016, 2017/0044297 A1, Christian Koenig, et al.
U.S. Appl. No. 15/307,242, filed Oct. 27, 2016, 2017/0051097 A1, Christian Koenig, et al.
U.S. Appl. No. 15/100,777, filed Jun. 1, 2016, 2016/0304686 A1, Iran Otero Martinez, et al.
U.S. Appl. No. 15/101,183, filed Jun. 2, 2016, 2016/0304687 A1, Iran Otero Martinez, et al.
U.S. Appl. No. 15/315,662, filed Jun. 13, 2014, WO 2015/189095, Iran Otero Martinez, et al.
Extended European Search Report dated Jun. 10, 2015 in European Patent Application No. 14195072.5.
International Search Report and Written Opinion dated Feb. 10, 2016 in PCT/EP2015/077833.
International Preliminary Report on Patentability dated Jun. 8, 2017 in PCT/EP2015/077833.

\* cited by examiner

SYNTHESIS OF POLYMER POLYOLS IN UNSATURATED POLYOLS, POLYMER POLYOLS AND THEIR USE

The present invention relates to the synthesis of polymer polyols in unsaturated polyols as liquid phase and their use.

WO2013039907 and US20100160469 (BASF SE, Bayer) describe the production of polymer polyol dispersions from natural oils for the manufacture of polymer polyols by using macromere polyols, polymerizable monomers, chain transfer agents and radical initiators by free radical polymerization.

JP 2011207943 A (Sanyo) discloses the production of polymer polyol dispersions based on castor oil and castor oil derivatives. The obtained products allegedly have excellent dispersion stabilities. JP2011098310 describes the use of such polyols for the manufacture of polyurethane (PU) sealing materials.

JP2010177066 discloses the use of such polyols in PU resins, and

WO2010055631 in sealing materials for membrane modules.

JP61200116 (Sanyo) discloses polymer polyols made from polyether polyols, polyester polyols and low-molecular polyols as liquid phase and from ethylenically unsaturated monomers forming the dispersed phase.

EP755953 mentions the manufacture of polymer polyols from modified castor oil polyols by free radical polymerization. The modified castor oil polyols were obtained by transesterification of castor oil with polyols based on propylene oxide (PO), ethylene oxide (EO) and dimeric fatty acids. The products allegedly are stable, agglomerate free and low-viscous graft co-polymer dispersions. The use of modified castor oil suggests that unmodified castor oil was not suitable.

WO 2009/138379 A2 describes dispersions containing at least one liquid polymer and at least one polymer particle mixture comprising at least one meltable solid and at least one copolymer.

WO 2008/055952 A1 discloses polyol dispersions, comprising at least one polyol and at least one polymer particle mixture comprising at least a thermoplastic polymer and at least a block copolymer.

EP 14166515.8 discloses a process for the production of polymer polyols by using an extruder and a rotor-stator.

EP 14166528.1 describes a stabilizer for melt emulsification processes to produce polymer polyols.

Polymer polyols, also known as filled polyols, are viscous fluids comprising fine particles dispersed in polyols. Examples of solids used include styrene-acrylonitrile copolymers and polyureas. The solids are typically prepared by in situ polymerization of monomers in the base polyol. Polymer polyols are commonly used for the production of polyurethane foams.

In some cases, it is desirable to use compounds containing C—C unsaturation as liquid phase referred to as carrier polyols or carriers for polymer polyols. For example, it may be preferable to employ compounds from naturally occurring renewable sources, like vegetable oils, as raw material, due to the limited supply of fossil resources. These compounds usually contain C—C unsaturation.

However, a problem that is frequently encountered when using C—C-unsaturated alcohol compounds as carriers for polymer polyols is that several side reactions can take place during radical polymerization. This often leads to high viscosity of the product. It is often almost impossible to process these polymer polyols, at least for standard applications.

Besides, filtration of these polymer polyol product obtained via radical polymerization is usually necessary, but when using C—C-unsaturated alcohol compounds as carriers, the filtration step is most often very difficult and time consuming due to formation of undesired larger particles. In addition, the polymer polyol product obtained via radical polymerization in some cases is not quite homogeneous.

Thus, there was a need in the art to avoid the above-mentioned problems. Furthermore, there was a desire in the art to provide hydrophobic polymer polyols, for example for the use in the production of polyurethanes for coating applications.

Surprisingly, the mentioned problems could be overcome by using a purely mechanical process for the production of polymer polyols in unsaturated polyols, a so-called "melt emulsification" process.

The melt emulsification process is very different from the standard process for the synthesis of polymer polyols by radical polymerization. Since there is no chemical polymerization reaction in the melt emulsification process, the dispersion is created through a physical (i.e. mechanical) process. Therefore, the melt emulsification method also requires different stabilizers (as defined below).

The term melt emulsification is defined in WO2009/155427 as follows:

Another way of dispersion the previously-formed polymer is to melt it, and then blend the molten polymer with the polyol under shear. The shearing action breaks the molten polymer into small droplets which become dispersed in the polyol phase. This process is described in U.S. Pat. No. 6,623,827. That patent describes a process wherein a previously-formed polymer is melted in an extruder, mixed with a stabilizer and a polyether polyol, and subsequently mixed with more of with the polyether polyol. The mixture is then cooled to solidify the particles.

Usually it is necessary to use stabilizers, as defined below, to maintain the dispersion stable (i.e. to avoid phase separation).

Thus, one object of the present invention is a process for making a polymer polyol, comprising mixing at least one melted thermoplastic styrene-acrylonitrile-copolymer (TP) with at least one polyol (P) in the presence of at least one stabilizer (S), comprising from 10 to 70% by weight, preferably 30 to 60% by weight, more preferably 40 to 55% by weight, based on the sum of all components, at least one polyol P2, and at least one polyol CSP which comprises the reaction product of at least one macromer M, styrene and acrylonitrile in polyol P2, optionally with an initiator and/or a chain transfer agent, wherein the content of macromer M of the stabilizer (S) is between 30-70 wt %, preferably 35 to 54 wt %, based on the sum of all components, and/or wherein the polyol CSP is preferably comb-structured, wherein the polyol (P) comprises at least one unsaturated carbon-carbon bond per molecule.

The mixing can be done with a stirrer, in one embodiment. The mixing may also be done by a stirrer, with vigorous stirring.

In another embodiment of the inventive process, in a first step (1), TP, P and S are fed into an extruder (E) to form an initial dispersion, and the initial dispersion obtained from the extruder is then fed, in a second step (2), into at least one rotor-stator device (RS) comprising at least one rotor-stator combination, and subsequently (3) the dispersion is cooled below the $T_g$ of the thermoplastic styrene-acrylonitrile-copolymer (TP) to obtain the final polymer polyol.

In a preferred embodiment of the present invention, the polyol (P) on average has at least two, preferably at least 2.5, double bonds per molecule.

The average number of double bonds per molecule may be determined by measuring the iodine number according to DIN 53241-1:1995-05 (based on the addition of iodine monochloride to olefinic double bonds).

The polybutadiene diols, as used in this invention, may be selected from the group consisting of Krasol® resins and Poly Bd® resins, manufactured by Cray Valley.

In particular, the following Krasol® resins and Poly Bd® resins may be used, separately or in combination: LBH-2000, LBSH-3000, LBH P-2000, LBH P-3000, Poly bd R45HTLO, Poly bd R45V, Poly bd R20LM.

The following table gives a summary of polybutadiene resins that may be used for the inventive process.

| | | | | | | |
|---|---|---|---|---|---|---|
| Krasol ® | | | | | | |
| Polybutadiene Resins | | | | | | |
| Product | OH Functionality | 1,2 vinyl (weight %, relative to the total compound) | Mn (g/mol) | OH value (meq/g) | Viscosity Pa.s @ 30 C. | Functionality |
| LBH 2000 | 1.9 | 65 | 2100 | 0.91 | 9 | secondary OH |
| LBH 3000 | 1.9 | 65 | 3000 | 0.64 | 13 | secondary OH |
| LBH 5000 | 1.9 | 65 | 5000 | 0.38 | 19 | secondary OH |
| LBH-P 2000 | 1.9 | 65 | 2100 | 0.91 | 9 | primary OH |
| LBH-P 3000 | 1.9 | 65 | 3000 | 0.64 | 13 | primary OH |
| LBH-P 5000 | 1.9 | 65 | 5000 | 0.38 | 19 | primary OH |
| Polyolefin Resins | | | | | | |
| | | | | | | Hydrogeneated |
| HLBH-P 2000 | 1.9 | — | 2100 | 0.91 | 62.6 | primary OH |
| HLBH-P 3000 | 1.9 | — | 3000 | 0.64 | 40 | primary OH |
| Poly bd grades | | | | | | |
| Commercial Name | Mn (g/mol) | $T_g$ (° C.) | Vinyl (%) | Viscosity (cps @ 30° C.) | Functionality | |
| R45HTLO | 2700 | −75 | 20 | 5000 |  | |
| R20LM | 1230 | −70 | 20 | 1400 | | |
| Krasol grades | | | | | | |
| Commercial Name | Mn (g/mol) | $T_g$ (° C.) | Vinyl (%) | Viscosity (cps @ 25° C.) | Functionality | |
| LBH 2000 | 2100 | −33 | 65 | 13,000 | Secondary | |
| LBH 3000 | 3000 | −40 | 65 | 20,000 | | |
| LBH 5000 | 5000 | −45 | 65 | 29,000 |  | |
| LBH 10000 | 10000 | −50 | 65 | 35,000* | | |
| LBH-P 2000 | 2100 | −30 | 65 | 13,000 | Primary | |
| LBH-P 3000 | 3000 | −41 | 65 | 20,000 | | |
| LBH-P 5000 | 5000 | −42 | 65 | 29,000 |  | |

In another embodiment of the present invention, polyol (P) comprises at least one polybutadiene diol.

In another embodiment of the present invention, polyol (P) consists of a polybutadiene diol.

The term polybutadiene diol, in the context of this invention, refers to low molecular weight, hydroxyl-terminated diols based on homopolymers of butadiene with molecular weights (Mn) lower than 10000 g/mol.

OH-Functionality of R45HTLO: OH value 0.85 meq/g, and of R20 LM: OH value 1.8 meq/g.

In a preferred embodiment of the inventive process, the polyol (P) comprises at least one polybutadiene diol.

Advantageously, the polybutadiene diols used for this invention have an OH functionality in the range of 1.5 to 2.5, preferably 1.7 to 2.1, and/or an 1,2-vinyl content of 55 to 75%, preferably 60 to 70%, and/or a molecular weight (Mn)

of 1000 to 6000 g/mol, preferably 1200 to 5500 g/mol, more preferably 2000 to 5200 g/mol, and/or an OH value of 0.2 to 1.2 mg KOH/g, preferably 0.3 to 1.0 mg KOH/g, and/or a viscosity at 30° C. of 8 to 25 Pa·s, preferably 9 to 20 Pa·s.

In a different embodiment of the inventive process, polyol (P) comprises at least one unsaturated natural oil with at least one an OH functional group per molecule, preferably castor oil.

In a preferred embodiment, polyol (P) consists of castor oil.

The inventive process may be a continuous process or a semi-batch process.

The term stabilizer may be defined as a compound obtained by reacting a macromer containing reactive unsaturation with styrene and acrylonitrile in a polyether polyol (usually a saturated polyol), optionally a chain transfer agent can be used. The inventive stabilizers are used for preparing polymer polyols containing small particles with D50 of below 25 µm, preferably below 10 µm, most preferably below 5 µm, via melt emulsification process and should be able to stabilize the polymer polyol dispersion for a prolonged period of time (prevention of phase separation).

The stabilizing effect is determined by storing samples for a prolonged time and visually inspecting them before and after the storage period of, usually, six months. When no precipitation has been formed at the bottom of the sample container (i.e. no phase separation), the sample is considered to be stable and thus, the stabilizer works.

The inventive stabilizers (S) are inherently different from preformed stabilizers used for standard graft process via free radical polymerization described in EO1675885, U.S. Pat. Nos. 6,013,731, 5,990,185 or EP0786480. Requirements and challenges for the process to form and stabilizer polymer polyol dispersions via radical polymerization are fundamentally different.

The stabilizer (S) is a compound that is assumed to stabilize dispersions of styrene acrylonitrile copolymers in a polyether phase, and thus is assumed to stabilize polymer polyol dispersions. In particular, the stabilizer (S) is assumed to stabilize polymer polyol dispersions obtained by melt emulsification processes.

In a preferred embodiment the polyols CSP contained in the stabilizers (S) are comb-structured.

In this preferred comb-structure, the typical distance between two macromers is between 16 units styrene and acrylonitrile up to 500 units of styrene and acrylonitrile, preferentially 30 units styrene and acrylonitrile up to 200 units of styrene and acrylonitrile.

These polyols CSP are assumed to have a backbone formed of styrene/acrylonitrile (SAN) polymer which interacts with the SAN contained in the polymer polyol product to be stabilized. Moreover, the macromers used for synthesizing the inventive stabilizer usually have functional groups that are assumed to interact with the polyols of the polymer polyol product to be stabilized and can reaction with the isocyanate during the PU reaction. This process improves the integration of graft particles in the PU network.

The stabilisers (S) usually have a viscosity in the range between 1000 to 100000 mPas, preferably 5000 to 80000 mPas, more preferably 8000 to 60000 mPas at 25° C.

The stabilisers (S) usually have an OH number of 1 to 100, preferably 1 to 50 mg KOH/g, more preferentially 10 to 40 mg KOH/g.

The hydroxyl number is determined in accordance with DIN 53240 from 2012 (DIN="Deutsche Industrienorm", i.e. German industry standard).

The viscosity of the polyols is, unless indicated otherwise, determined at 25° C. in accordance with DIN EN ISO 3219 from 1994 by means of a Rheotec RC20 rotational viscometer using the spindle CC 25 DIN (spindle diameter: 12.5 mm; internal diameter of measuring cylinder: 13.56 mm), however at a shear rate of 100/1 s (instead of 50/1 s).

In a preferred embodiment of the stabilizer (S), the ratio of styrene to acrylonitrile is greater than 1:1, preferentially greater 1.5:1, most preferred greater 2:1.

The synthesis of the stabilizers (S) described herein is usually carried out by reacting a macromere or a mixture of macromeres with styrene and acrylonitrile in a carrier polyol (P2), usually a saturated polyol, in the presence of a radical initiator and optionally a chain transfer agent in a free radical polymerization. This reaction is usually carried out in a semi-batch process; however a batch procedure or a continuous process is also possible. The monomers, the macromere or the macromere mixture, the carrier polyol, the initiator or the chain transfer agent can be added to the reactor before, during or after the reaction, continuously or stepwise.

Different radical initiators can be used, for example azoderivatioves, such as AIBN, peroxides such as tert-amyl peroxides, hydroperoxides and percarbonates. Most preferred are azoderivivatives, in particular AIBN (azoisobutyro nitrile) and/or Dimethyl 2,2'-azobis(2-methylpropionate).

The stabilizers (S) preferably have a particle size D50 smaller than 0.5 µm, more preferentially smaller than 0.3 µm (as determined by static laser diffraction using a Mastersizer 2000 (Malvern Instruments Ltd) after dilution of the sample with isopropanol in order to obtain an optical concentration suitable for the measurement. For the dispersion of the sample a dispersing module Hydro SM was used with a stirrer speed of 2500 rpm. The calculation of the particle size distribution may be performed by the Mastersizer 2000 using Fraunhofer theory.)

Preferably, the amount of stabilizer in the inventive process, relative to the total amount of all components, is between 5 to 30 weight %, particularly preferably 8 to 20 weight %.

Synthesis of Macromers M

A macromere is defined as a molecule which comprises one or more polymerizable double bonds able to copolymerize with vinylic monomers such as styrene and acrylonitrile and which comprises one or more hydroxyl-terminated polyether chains. Typical macromers comprise polyether polyols having an unsaturated group, which are commonly manufactured by reacting a standard polyether polyol with an organic compound containing an unsaturated group and a car-boxyl, anhydride, isocyanate, epoxy or other functional group able to react with active hydrogen-containing groups. The group of useful isocyanates comprises isocyanato ethyl methylacrylate (IEM) and 1,1-dimethyl meta isopropenyl benzyl isocyanat (TMI).

In a preferred embodiment of this invention, TMI is used for manufacturing the macromere (M).

Usually, macromers are synthesized in the presence of Lewis acid catalysts. The suitable Lewis acid catalysts generally comprise tin-based, boron-based, aluminum-based, gallium-based, rare earth-based, zinc-based, or titanium-based compounds. Representative tin-based compounds include: Dibutyltin diacetate, Dibutyltin dibromide, Dibutyltin dichloride, Dibutyltin dilaurate, Dibutyltin dimethoxide, Dibutyltin oxide, Dimethyltin diacetate, Dimethyltin dibromide, Diphenyltin dichloride, Diphenyltin oxide, Methyltin trichloride, Phenyltin trichloride, Tin(IV) acetate, Tin(IV) bromide, Tin(IV) chloride, Tin(IV) iodide, Tin(II) oxide, Tin(II) acetate, Tin(II) bromide, Tin(II) chloride, Tin(II) iodide, and Tin(II) 2-ethylhexanoate (stannous octoate). Representative boron-based compounds include:

Boron tribromide, Boron trichloride, Boron trifluoride, and tris(pentafluorophenyl)borane. Representative aluminum-based compounds include: Aluminum chloride and Aluminum bromide. Representative gallium-based compounds include: Gallium chloride, Gallium bromide, and Gallium (III) actylacetonate.

Representative rare earth catalysts are generally salts of Scandium, Yttrium, Lanthanum, Praseodymium, Neodymium, Erbium, Thulium, Ytterbium, Neodymium or Lutetium. Examples include: Ytterbium triflate, Ytterbium (III) actylacetonate, Erbium(III) trifluorosulfonate (erbium triflate), Erbium(III) actylacetonate, Holmium triflate, Terbium triflate, Europium triflate, Europium(III) trifluroacetate, Samarium triflate, Neodymium triflate, Neodymium (III) actylacetonate, Praseodymium triflate, Lanthanum triflate, and Dysprosium triflate. Representative zinc-based compounds include Zinc chloride and Zinc bromide. Representative titanium compounds include Titanium(IV) bromide and Titanium(IV) chloride.

A number of methods for inducing reactive unsaturation into a polyol are known in the art. The synthesis of useful macromers is described in WO2005/003200. Macromer A is a product obtained by reaction of a three-functional polyether polyol with 1,1-Dimethyl meta-isopropenyl benzyl isocyanate (TMI). Macromer B is a product obtained by reaction of a six-functional polyether polyol with 1,1-Dimethyl meta-isopropenyl benzyl isocyanate (TMI).

In a preferred embodiment of this invention, the macromere (M) has a functionality of 2 to 8.

Preferably, the macromere (M) is based on glycerine and/or sorbitol, and/or has a molecular weight of more than 4000 g/mol.

Usually, according to this invention, the amount of the macromere in relation to the total stabilizer is 30 to 70 weight %, preferably 35 to 54 weight %.

In a preferred embodiment of the inventive process, the amount of the sum of the monomers styrene and acrylonitrile, relative to the total stabilizer, is 5 to 30 weight %, preferably 7 to 25 weight %.

General Procedure for Synthesizing a Stabilizer

A glass reactor was charged with an additional polyol (P2, so-called "carrier polyol"), optionally already in the beginning a macromer or a mixture of macromers, optionally acrylonitrile, optionally styrene, optionally a chain transfer agent and heated to 125° C. A mixture of carrier polyol, initiator, styrene, acrylonitrile and macromer or a mixture of macromers were added over 100 minutes. The reaction mixture was stirred for another 20 minutes at 125° C. The mixture was subsequently evacuated under reduced pressure for 120 minutes at 125° C. to remove residual monomers. The obtained stabilizers were characterized and used without further purification.

The composition of representative stabilizers obtained by this procedure are shown in table x. All amounts are given in weight %. All experiment were carried out by using 0.5 weight % of azo initiator (Dimethyl 2,2'-azobis(2-methylpropionate) and 0.4% of a thiol containing chain transfer agent. The weight percentages given in this section refer to the final product (i.e. the stabilizer).

The additional polyol ("carrier polyol") P2 contained in the stabilizer S may be selected from polyether polyols (PEOLs), preferably from the group consisting of PEOLs with a molecular weight between 1000 and 6000 g/mol, more preferably selected from the group consisting of PEOLs with a molecular weight between 2000 and 5000 g/mol.

As the additional polyol P2 ("carrier polyol"), for example the BASF product Lupranol® 2095 may be used.

Lupranol® 2095 is a trifunctional polyether polyol with primary hydroxyl end groups and an OH no. of 35 mg KOH/g (as measured according to DIN53240) and a viscosity of 850 mPas at 25° C. (as measured according to DIN EN 12092). Lupranol® 2095 is mainly used for the production of highly elastic soft polyurethane formed foams. Furthermore, Lupranol® 2095 is used for the manufacture of semi-rigid formed parts. Other fields of use are flexible integral foams and RIM parts for the automotive sector.

In the following examples, some aspects of the present invention are illustrated.

The following dispersions were obtained by using commercially available styrene-acrylonitrile copolymer types with different compositions of styrene and acrylonitrile. For example Starex® types from Samsung, Luran® types from Styrolution, Tyril® types from Dow Chemical, Lustran® types from Ineos can be used. The relative composition is typically between 65 and 85% by weight styrene and 15 to 35% acrylonitrile.

COMPARATIVE EXAMPLE 1

Radical Polymerization using Castor Oil as Carrier Polyol 714.9 g castor oil, 4.5 g macromer B (6-functional polyetherol having a hydroxyl number of 18.4 mg KOH/g, reacted with meta TMI (1-2-isocyanatopropan-2-yl)-3-(prop-1-en-2-yl)benzene)) were charged in a stirred reactor and purged with nitrogen. The mixture was heated to 125° C. A mixture of 333.3 g acrylonitrile, 10.5 g 1-dodecanthiol, 666.7 g styrene as well as 4.7 g Vazo 64 dissolved in 714.9 g castor oil were added to the reaction mixture in 2 separate streams over 150 min. At the end of this reaction the mixture was allowed to react for another 15 min. The resulting product was stripped under vacuum and finally cooled to room temperature.

Viscosity: 4500 mPas measured at RT with a shear rate of 100 1/s
OH-value: 96.8 mg KOH/g The sample was not phase stable and contained particles that precipitated overnight.

EXAMPLE 1

Use of Stabilizer 2 with Castor Oil

A round bottom-flasked equipped with a stirrer and a nitrogen inlet was charged with 280 g of Luran® VLR and

| Stabilizer No. | styrene in weight % | acrylonitrile in weight %. | macromer A in weight % | macromer B in weight % | carrier Polyol, in weight % 1 | OH-value in mg KOH/g | viscosity in mPas |
|---|---|---|---|---|---|---|---|
| 1 | 7.8 | 4.2 | 50 | 0 | 37 | 25.3 | 14990 |
| 2 | 5.5 | 4 | 0 | 41 | 48.5 | 25.1 | 9913 |

70 g of the stabilizer 1 and heated to 240° C. under nitrogen atmosphere. The mixture was stirred for 20 minutes at this temperature. 350 g castor oil was heated to 240° C. and added with vigorous stirring. The mixture was stirred for additional 60 minutes after addition and then cooled to RT. The particle size was determined by light scattering as described before. The particle size is used as an indicator for the efficiency of the stabilizer system.
Viscosity: 5680 mPas
OH-value: 84.55 mg KOH/g
Particle size D10: 0.95 µm
Particle size D50: 2.54 µm
Particle size D90: 5.21 µm

EXAMPLE 2

Use of Stabilizer 1 with Castor Oil

A round bottom-flasked equipped with a stirrer and a nitrogen inlet was charged with 280 g of Luran® VLR and 70 g of the stabilizer 2 and heated to 240° C. under nitrogen atmosphere. The mixture was stirred for 20 minutes at this temperature. 350 g castor oil was heated to 240° C. and added with vigorous stirring. The mixture was stirred for additional 60 minutes after addition and then cooled to RT. The particle size was determined by light scattering as described before. The particle size is used as an indicator for the efficiency of the stabilizer system.
Viscosity: 5340 mPas
OH-value: 84.7 mg KOH/g
Particle size D10: 0.91 µm
Particle size D50: 1.91 µm
Particle size D90: 3.82 µm

COMPARATIVE EXAMPLE 2

Radical Polymerization using Polybd R20 as Carrier Polyol 714.9 g PolyBD R20, 4.5 g macromere B (6-functional polyetherol having a hydroxyl number of 18.4 mg KOH/g, reacted with meta TMI (1-2-isocyanatopropan-2-yl)-3-(prop-1-en-2-yl)benzene)) were charged in a stirred reactor and purged with nitrogen. The mixture was heated to 125° C. A mixture of 333.3 g acrylonitrile, 10.5 g 1-dodecanthiol, 666.7 g styrene as well as 4.7 g Vazo 64 dissolved in 714.9 g PolyBD R20 were added to the reaction mixture in 2 separate streams over 150 min. Stirring could not be continued due to an significant increase of viscosity. At the end of this reaction the mixture was allowed to react for another 15 min. The resulting product was stripped under vacuum and finally cooled to room temperature. Instead of a dispersion a solid, rubber like material was formed.

EXAMPLE 3

Use of Stabilizer 1 with PolyBD R20 as Carrier Polyol

A round bottom-flasked equipped with a stirrer and a nitrogen inlet was charged with 200 g of Luran® VLR and 50 g of the stabilizer 1 and heated to 240° C. under nitrogen atmosphere. The mixture was stirred for 20 minutes at this temperature. 300 g PolyBD R20 was heated to 240° C. and added with vigorous stirring. The mixture was stirred for additional 60 minutes after addition and then cooled to RT. The particle size was determined by light scattering as described before. The particle size is used as an indicator for the efficiency of the stabilizer system.
Viscosity: 17300 mPas
OH-value: 48.64 mg KOH/g
Particle size D10: 1.11 µm
Particle size D50: 2.61 µm
Particle size D90: 34.91 µm

EXAMPLE 4

Use of Stabilizer 2 With PolyBD R20 as Carrier Polyol

A round bottom-flasked equipped with a stirrer and a nitrogen inlet was charged with 200 g of Luran® VLR and 50 g of the stabilizer 1 and heated to 240° C. under nitrogen atmosphere. The mixture was stirred for 20 minutes at this temperature. 300 g PolyBD R20 was heated to 240° C. and added with vigorous stirring. The mixture was stirred for additional 60 minutes after addition and then cooled to RT. The particle size was determined by light scattering as described before. The particle size is used as an indicator for the efficiency of the stabilizer system.
Viscosity: 17800 mPas
OH-value: 48.42 mg KOH/g
Particle size D10: 1.12 µm
Particle size D50: 5.07 µm
Particle size D90: 40.10 µm The experimental data show that the inventive process leads, on average, to smaller particles compared to the standard radical polymerization process. In addition, it can be seen that the polymer polyol dispersions produced by the inventive process are, on average, more homogeneous than the products obtained by the standard process.

The polymer polyol products obtainable by the inventive process usually have OH numbers of less than 300 mg KOH/g, preferably less than 200 mg KOH/g.

The polymer polyols produced by the inventive process may be used to manufacture polyurethanes. In addition, elastomers (for example cast elastomers) may be produced.

The resultant cast elastomers are suitable for industrial applications that require durable physical and mechanical properties in the final elastomers. Industrial rolls such as paper mill rolls, industrial wheels for example.

Possible applications include roller coatings, electrical encapsulation, pipeline pigs, knives, wheels, rollers, screens. Furthermore, the cast elastomers may be used for the production of formed parts as adhesives or sealants.

Line segments coated with polyurethane in the sense of this invention do not only include classically coated tube coatings, but also welding areas of tubes coated with polyurethane (so-called "field joints") and objects coated with polyurethane connected with tubes, for example muffles, drill hole connections, Xmas trees ("Eruptionskreuze"), tube collectors, pumps and buoys.

In a preferred embodiment of this invention, the inventive line segment coated with polyurethane is a tube of an off-shore pipeline coated with polyurethane, for example for the extraction of crude oil.

Examples of embodiments of the present invention also include specific elastomer coating and sealing applications, like wheels and tires, drum coatings, spring elements and absorbers, sieves, sealing elements, for example gasket rings, doctor blades, and isolators and switches in anticorrosive coatings.

The invention claimed is:
1. A process for making a polymer polyol, the process comprising:
mixing at least one melted thermoplastic styrene-acrylonitrile-copolymer (TP) with at least one polyol (P) in the presence of at least one stabilizer (S),
wherein the polyol (P) comprises at least one unsaturated carbon-carbon bond per molecule, and
wherein the stabilizer (S) comprises:
(i) from 10 to 70% by weight, based on the total weight of the stabilizer (S), of at least one saturated polyol (P2); and
(ii) at least one polyol (CSP) which comprises a reaction product of at least one macromer (M), styrene, and acrylonitrile in the saturated polyol (P2), optionally with an initiator and/ or a chain transfer agent,
wherein the content of macromer (M) in the stabilizer (S) is between 30-70 wt %, based on the total weight of the stabilizer (S), and
wherein the macromere M is defined as a molecule which comprises one or more polymerizable double bonds able to copolymerize with vinylic monomers and which comprises one or more hydroxyl-terminated polyether chains.

2. The process according to claim 1, wherein the process is a continuous process.

3. The process according to claim 1, wherein the process is a semi-batch process.

4. The process according to claim 1, wherein the polyol (P) comprises at least one polybutadiene diol.

5. The process according to claim 1, wherein the polyol (P) comprises at least one natural oil with an at least one OH functional group per molecule.

6. The process according to claim 1, wherein the polyol (P) consists of castor oil.

7. The process according to claim 1, wherein the polyol (P) on average has at least two double bonds per molecule.

8. The process according to claim 1, wherein the polyol (P) consists of a polybutadiene polyol.

9. The process according to claim 1, wherein the polyol (P) consists of a polybutadiene polyol and wherein the polyol (P) on average has at least 2 double bonds per molecule.

10. The process according to claim 1, wherein the stabilizer (S) consists of:
one or two saturated polyols (P2); and
one or two polyols (CSP),
wherein the initiator is selected from the group consisting of azo initiators and peroxide initiators and/or the chain transfer agent is selected from the group consisting of dodecane thiol, isopropanol, and 2-butanol.

11. The process according to claim 1, wherein the stabilizer (S) consists of:
one or two saturated polyols (P2); and
one or two polyols (CSP), which consist of the reaction product of the macromer (M), the styrene, and the acrylonitrile in the saturated polyol (P2).

12. The process according to claim 1, wherein the macromer (M) has an average molecular weight $M_W$ of from 1000 to 50000 g/mol.

13. The process according to claim 1, wherein the macromer (M) has from 0.2 to 1.2 polymerizable ethylenically unsaturated groups per molecule in average and/or from 2 to 8 hydroxyl groups per molecule.

14. The process according to claim 1, wherein the macromer (M) is obtained by reacting 1,1-dimethyl meta isopropenyl benzyl isocyanate with a polyether polyol (PM), optionally in the presence of a Lewis acid catalyst.

15. The process according to claim 14, wherein the polyether polyol (PM) used in the production of the macromer M is selected from the group consisting of three- and six-functional polyether polyols.

16. The process according to claim 1, wherein the ratio of styrene to acrylonitrile in the stabilizer (S) is greater than 1:1.

17. The process according to claim 1, wherein the viscosity of the stabilizer (S) is between 1000 and 100000 mPas at 25° C., determined according to DIN EN ISO 3219 and a shear rate of 100 1/s.

18. The process according to claim 1, wherein the stabilizer (S) comprises, based on the total weight of the stabilizer (S):
between 0.5 and 20 wt % of the styrene; and/or
between 0.5 and 15 wt % of the acrylonitrile; and/or
between 20 and 69 wt % of the saturated polyol (P2).

19. The process according to claim 1, wherein the stabilizer (S) comprises no additional solvent.

20. The process according to claim 1, wherein the stabilizer (S) is produced by free radical polymerization of the styrene, the acrylonitrile, the macromer (M), optionally the chain transfer agent, and optionally the initiator in the presence of the saturated polyol (P2).

21. The process according to claim 20, wherein the chain transfer agent is present during the free radical polymerization.

22. The process according to claim 21, wherein the transfer agent is at least one selected from the group consisting of dodecane thiol, isopropanol, and 2-butanol.

23. The process according to claim 21, wherein less than 5% by weight of the chain transfer agents are present, relative to the total weight of the reaction mixture.

24. The process according to claim 20, wherein the free radical polymerization is carried out at a reaction temperature between 80° and 150° C. and/or a reaction time between 10 min and 300 min.

25. The process according to claim 20, wherein the initiator is present during the free radical polymerization.

26. The process according to claim 20, wherein less than 1% by weight of the initiators are used, relative to the total weight of the reaction mixture.

27. The process according to claim 1, wherein the saturated polyol (P2) is selected from the group consisting of polyether polyols.

28. The process according to claim 1, wherein the mixing comprises
feeding the thermoplastic styrene-acrylonitrile-copolymer (TP), the polyol (P), and the stabilizer (S) into an extruder (E), to form an initial dispersion;
feeding the initial dispersion into a rotor-stator device (RS) comprising at least one rotor-stator combination; and subsequently
cooling the dispersion below the $T_g$ of the thermoplastic styrene-acrylonitrile-copolymer (TP), to obtain the polymer polyol.

29. The process according to claim 28, wherein the extruder (E) is divided into at least two separate process zones.

30. The process according to claim 29, wherein the thermoplastic styrene-acrylonitrile-copolymer (TP) is fed into the first process zone (Z1) of the extruder (E), the stabilizer (S) is fed into the second process zone (Z2) or a later process zone, and the polyol (P) is fed into a process zone following the process zone of addition of the stabilizer (S), wherein the terms "first" and "second" refer to a flow direction of the reaction mixture in the extruder (E).

31. The process according to claim 28, wherein there is at least one process zone of the extruder (E) with no addition of components between the addition of the stabilizer (S) and the addition of the polyol (P).

32. The process according to claim 28, wherein the polyol (P) is fed into at least two different process zones of the extruder (E).

33. The process according to claim 29, wherein the extruder (E) is operated at a barrel temperature in the range of between 160° to 250° C. in at least one of the process zones.

34. The process according to claim 28, wherein the extruder (E) has a rotation speed in the range of 400 to 1200 rpm.

35. The process according to claim 28, wherein a stripping column or stripping-vessel is used after the rotor-stator device (RS) to remove volatile material.

36. The process according to claim 28, wherein the rotor-stator device (RS) is operated at a set temperature in the range of between 160° to 250° C.

37. The process according to claim 28, wherein the rotor-stator device (RS) has a circumferential speed in the range of 10 to 60 $s^{-1}$.

38. The process according to claim 28, wherein the rotor-stator device (RS) comprises at least two rotor-stator combinations.

39. The process according to claim 38, wherein single rotor-stator combinations have differing teeth.

40. The process according to claim 28, wherein the polyol (P) is added to the extruder (E) at a temperature of above 100° C.

41. The process according to claim 28, wherein the stabilizer (S) is added to the extruder (E) at a temperature of above 100° C.

42. A polymer polyol obtained by the process of claim 1.

43. The process according to claim 1, wherein the polyol CSP is comb-structured.

* * * * *

UNITED STATES PATENT AND TRADEMARK OFFICE
CERTIFICATE OF CORRECTION

PATENT NO. : 10,294,336 B2
APPLICATION NO. : 15/531147
DATED : May 21, 2019
INVENTOR(S) : Christian Koenig et al.

Page 1 of 1

It is certified that error appears in the above-identified patent and that said Letters Patent is hereby corrected as shown below:

In the Specification

Column 6, Line 22, "azoderivatioves," should read -- azoderivatives --;
　　　Line 24, "azodervivatives," should read -- azoderivatives, --;
　　　Line 47, "unsatured" should read -- unsaturated --; and
　　　Line 48, "car-boxyl," should read -- carboxyl, --.

Column 7, Line 56, "(Dimethyl" should read -- Dimethyl --.

Column 8, Line 39, "benzene))" should read -- benzene) --.

Column 9, Line 43, "benzene))" should read -- benzene) --.

Signed and Sealed this
Eleventh Day of February, 2020

Andrei Iancu
*Director of the United States Patent and Trademark Office*